Jan. 17, 1967 HISAO MAEDA 3,299,280

PARAMETRON BRIDGE CIRCUIT UTILIZING FERROMAGNETIC THIN FILM

Filed Oct. 15, 1963

INVENTOR.
Hisao Maeda

BY

Meston and Meston 3,299,280
Patented Jan. 17, 1967

3,299,280

PARAMETRON BRIDGE CIRCUIT UTILIZING FERROMAGNETIC THIN FILM

Hisao Maeda, 211 Minamisenzoku-Machi, Ota-ku, Tokyo-to, Japan

Filed Oct. 15, 1963, Ser. No. 316,415
Claims priority, application Japan, Oct. 17, 1962, 37/46,188
2 Claims. (Cl. 307—88)

The present invention relates to a system of coupling bridge type parametrons wherein each bridge consists of a wire coated with a thin film of ferromagnetic material.

The nature, principle, and details of the invention, as well as the objects and advantages thereof, will be best understood by reference to the following description, taken in conjunction with the accompanying drawing in which like parts are designated by like reference characters, and in which.

Figure 1:
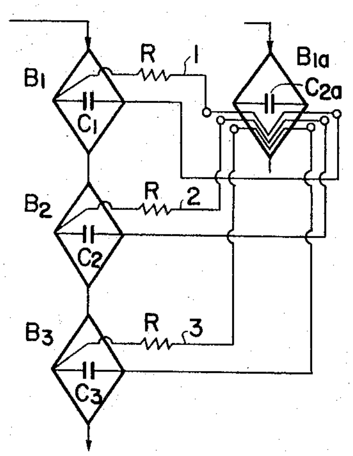
FIGURE 1 is an electrical wiring diagram indicating one example of coupling of a bridge type parametron.

The bridge-type parametron generally has a construction wherein the arms of an electrically balanced bridge are formed by wire coated with ferromagnetic thin film, that is, a core wire of a diamagnetic material or nonmagnetic material such as, for example, copper, molybdenum, Invar, or other suitable material, covered with a film of ferromagnetic material such as permalloy. When such a parametron is to be coupled, since the wire coated with a ferromagnetic thin film has the characteristic of readily drawing in external magnetic flux in said thin film, it is possible to effect coupling by merely disposing the input wire from the preceding stage in the vicinity of the bridge wire coated with ferromagnetic thin film. Accordingly, in the case of, for example, three-kind excitation as indicated in FIGURE 1, input lines 1, 2, and 3 led out from the respective terminals of tuning capacitors $C_1$, $C_2$, and $C_3$ of three parametron bridges $B_1$, $B_2$, and $B_3$ belonging to the same excitation group may be respectively arranged in close proximity along one portion or the entire lentgh of arms of a parametron bridge $B_{1a}$ of the succeeding stage, said bridge $B_{1a}$ being to be excited by input current of three kinds.

In the case of five-kind or seven-kind excitation, the number of input lines becomes five or seven, but for the sake of simplicity, the following description will be restricted to only the case of three-kind excitation.

In the case when three input currents are applied on a single parametron element as mentioned hereinbefore, the ideal state is that wherein the absolute values of the magnitudes of the three input currents are equal.

That is, if the absolute value of each of the magnitudes of these input currents is assumed to be one (unity), the following four cases of the resultant values of the three input currents will be possible.

(I) Input values: +1, −1, +1;
Resultant value: +1
(II) Input values: +1, −1, −1;
Resultant value: −1
(III) Input values: +1, +1, +1;
Resultant value: +1
(IV) Input values: −1, −1, −1;
Resultant value: −1

Of these cases, cases (III) and (IV) do not present any problem. In cases (I) and (II), however, although the resultant value must be either +1 or −1, when the respective absolute values of the three input currents are different, they naturally differ from the value of +1 or −1 and give rise to an error, which will lead to much inconvenience.

Figure 2:
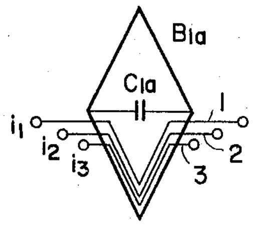
FIGURE 2 is a diagram of a single element of the parametron shown in FIGURE 1.

If, in FIGURE 2, the input currents of the input lines 1, 2, and 3 are respectively denoted by $i_1$, $i_2$, and $i_3$, and the input voltages induced thereby are respectively denoted by $e_1$, $e_2$, and $e_3$, the following relationships will be valid.

$$e_1=M_1i_1$$
$$e_2=M_2i_2$$
$$e_3=M_3i_3$$

where $M_1$, $M_2$, and $M_3$ respectively indicate the coefficients of mutual induction between the three input lines 1, 2, and 3 and the parametron circuit.

For this reason, even if, as a supposition, the input currents $i_1$, $i_2$, and $i_3$ are each equal to $i_0$ as an ideal value, the voltages $e_1$, $e_2$, and $e_3$ will mutually differ if the coefficients of the mutual inductions $M_1$, $M_2$, and $M_3$ are different.

Moreover, it is extremely difficult to make the coefficients of the mutual inductions $M_1$, $M_2$, and $M_3$ equal because of reasons such as, for example, that the disposition of the three input lines 1, 2, and 3 at equal space intervals with respect to a single bridge line is difficult in actual practice.

Figure 3:
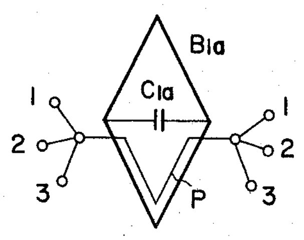
FIGURE 3 is a diagram of a parametron element according to the present invention.

In order to overcome such difficulties, the present invention provides an arrangement as indicated in FIGURE 3, wherein a single, a common input line P is adopted to serve as a coupling coil, and the input lines 1, 2, and 3 are connected to this common input line P.

In this case, if the coefficient of mutual induction of the common input line P and the parametron is denoted by $M_0$, the afore-mentioned voltages $e_1$, $e_2$, and $e_3$ may be expressed as follows:

$$e_1=M_0i_1$$
$$e_2=M_0i_2\text{; and}$$
$$e_3=M_0i_3$$

Therefore, if the currents $i_1$, $i_2$, and $i_3$ are made equal, $$e_1=e_2=e_3$$

Accordingly, even if a large number of input currents are combined, the possibility of error occurring in their resultant value will be reduced.

Figure 4:
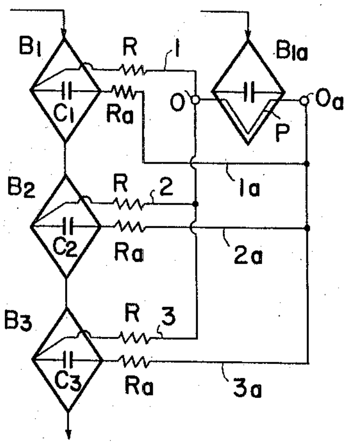
FIGURES 4 and 5 are wiring diagrams indicating embodiments of the parametron coupling system according to the present invention.

An example of coupling in which the principle of the present invention is applied is indicated in FIGURE 4 (illustrating the case of three-kind excitation). By this arrangement, input lines 1, 2, and 3, and output leads 1*a*, 2*a* and 3*a* from the parametrons of the preceding stage are connected to the two ends O and O*a* of the common input line P.

Figure 5:
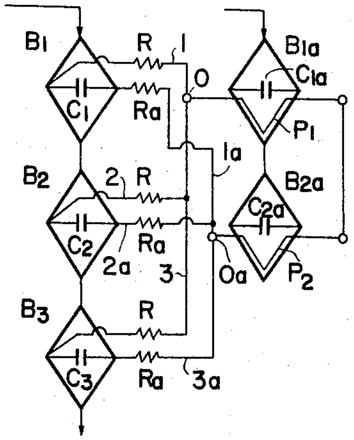

FIGURE 5 indicates another case wherein the inputs from a plurality of parametrons are differentially connected to a plurality of parametrons of the succeeding stage. In this case, one end of the common input line $P_1$ is connected to one end of the common input line $P_2$, and to the other ends O and O*a* of these lines $P_1$ and $P_2$ the input line groups 1, 2, 3 and output leads 1*a*, 2*a*, 3*a* may be respectively connected.

In both of the above cases, in order to prevent the mixing of input from each input line into another input line, resistances R and R*a* may be inserted in these input lines, but the resistance R*a* may be omitted depending on the relationships of the circuit impedances.

By the practice of the present invention, since various inputs from a plurality of parametrons of a preceding stage are combined beforehand to enter a single, common input line and coupled to the succeeding stage, the possibility of error occurring in the resultant value of the various inputs is small, whereby accurate operation of the parametrons is afforded.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. In a parametron bridge circuit comprising a first stage including a plurality of serially connected parametron bridges and a second stage including at least one parametron bridge, each of said bridges of said first and second stages comprising bridge arms formed by core wires coated with ferromagnetic films, a tuning capacitor connected across balanced terminals of said bridge thereby to cause oscillation; said first and second stages having a single input line disposed closely adjacent to, and in parallel with, bridge arms of said second stage, a plurality of outputs derived from the opposite terminals of said tuning capacitor of said first stage applied to said single input line of said second stage, thereby to cause a decision by majority and to cause coupling as the result of said decision to the parametron bridge of said second stage through said single input line.

2. A parametron bridge circuit as defined in claim 1, wherein said second stage comprises two parametron bridges connected in series, each having a single input line; input lines of the bridges of said second stages being series-connected; and said plurality of inputs being applied across said series-connected input lines of said second stage.

References Cited by the Examiner

UNITED STATES PATENTS

| | | | |
|---|---|---|---|
| 2,988,730 | 6/1961 | Prywes | 340—174 |
| 3,066,228 | 11/1962 | Yamada | 307—88 |

FOREIGN PATENTS 1,363,569 5/1964 France.

OTHER REFERENCES

Nussbaumer, H.: Coupling Wire Parametric Cells, in IBM Technical Bulletin, vol. 6, No. 2, July 1963, pages 46–47.

BERNARD KONICK, *Primary Examiner.*

LLOYD McCOLLUM, *Examiner.*

J. W. MOFFITT, W. E. RAY, *Assistant Examiners.*